United States Patent [19]
Böhnstedt et al.

[11] Patent Number: 6,124,059
[45] Date of Patent: Sep. 26, 2000

[54] SEPARATOR FOR SEALED LEAD ACCUMULATORS

[75] Inventors: Werner Böhnstedt, Henstedt-Ulzburg; Jörg Deiters, Norderstedt; Klaus H. Ihmels, Hamburg; Jürgen Ruhoff, Norderstedt, all of Germany

[73] Assignee: Daramic, Inc., North Charleston, S.C.

[21] Appl. No.: 09/101,400

[22] PCT Filed: Jun. 23, 1998

[86] PCT No.: PCT/EP98/03790

§ 371 Date: Sep. 1, 1998

§ 102(e) Date: Sep. 1, 1998

[87] PCT Pub. No.: WO99/67831

PCT Pub. Date: Dec. 29, 1999

[51] Int. Cl.$^7$ .................................... H01M 2/16
[52] U.S. Cl. ........................ 429/252; 428/319.1
[58] Field of Search ................ 429/252; 428/317.9, 428/319.1

[56] References Cited

U.S. PATENT DOCUMENTS

| | | | |
|---|---|---|---|
| 4,119,772 | 10/1978 | Peters et al. | 429/204 |
| 4,298,668 | 11/1981 | Schmidt et al. | 429/252 X |
| 5,009,971 | 4/1991 | Johnson et al. | 429/252 |
| 5,336,573 | 8/1994 | Zuckerbrod et al. | 429/252 |
| 5,362,582 | 11/1994 | Chang et al. | 429/249 |
| 5,720,780 | 2/1998 | Liu et al. | 29/623.1 |
| 5,882,721 | 3/1999 | Delnick | 429/252 X |
| 5,928,811 | 7/1999 | Khavari | 429/252 |
| 5,948,464 | 9/1999 | Delnick | 429/252 X |

FOREIGN PATENT DOCUMENTS

| | | |
|---|---|---|
| 814520 | 12/1997 | European Pat. Off. . |
| 1496123 | 3/1969 | Germany . |
| 2720250 | 11/1978 | Germany . |
| 19702757 | 7/1998 | Germany . |
| WO 94/18710 | 8/1994 | WIPO . |
| WO 94/20995 | 9/1994 | WIPO . |
| WO 95/13316 | 5/1995 | WIPO . |

*Primary Examiner*—Stephen Kalafut
*Attorney, Agent, or Firm*—Nields, Lemack & Dingman

[57] ABSTRACT

The invention relates to microporous battery separators based on an essentially homogeneous mixture of a thermoplastic polymer, an inert filler and optionally a plasticizer. The separators contain, as filler, pyrogenic silica in a quantity of more than 20 vol. % and optionally one or more further fillers, so that the filler content overall is more than 60 up to a maximum of 82 vol.-%. The separators are suitable in particular for the manufacture of sealed accumulators.

32 Claims, No Drawings

SEPARATOR FOR SEALED LEAD ACCUMULATORS

The present invention relates to porous separators which are suitable in particular for sealed lead-sulphuric acid accumulators.

In accumulators and batteries with acid electrolytes, such as for example lead-sulphuric acid accumulators, battery separators are used in order to prevent a direct contact between the oppositely charged electrode plates and suppress the occurrence of short-circuits between the plates caused by metal particles.

The separators consist of a non-conductive material which guarantees an electrolytic current transport. Battery separators should have a low electrical resistance, i.e. allow the ionic current flow to pass in as unhindered a manner as possible.

In addition, battery separators must be resistant to the chemical and physical conditions inside the battery, i.e. to oxidative and acid conditions both at ambient and at increased temperature.

For applications with a high energy and power requirement, such as e.g. in electric vehicles, there is a need for compact, maintenance-free accumulators with high capacity. The achievement of high performance levels with a compact structure requires the smallest possible distances between the electrode plates and thus the thinnest possible separators.

In recent developments of sealed lead batteries, a free electrolyte is completely dispensed with and the space between the electrode plates is completely filled by the separator. The electrolyte is absorbed by the separator. Because of the small distances between electrodes and the small separator thickness which these cause, materials with a high acid-absorption capacity are necessary in order to guarantee an adequate quantity of acid for the electrochemical conversion.

To ensure a uniform flow of current with this structure and prevent a drying out of the electrodes, a good contact between electrodes and separator must be guaranteed over the whole electrode surface. To achieve this, electrodes and separators are brought together under pressure. At the same time, a long battery life is guaranteed in this way, as a deficient electric contact between the lead oxide particles of the active mass of the positive electrode and between active mass and current shunt grid causes a reduction in mass utilization and thus a premature loss of capacity with a low cycle life.

With a view to a sought-after freedom from maintenance, such accumulators are usually manufactured in sealed form. This requires suitable measures for preventing the consumption of water caused by the escape of oxygen and hydrogen which can be formed during the charging process through decomposition of the water. In the ideal case, the oxygen formed at the positive electrode is completely consumed at the negative electrode and a consumption of water as a result of the charging process is thereby prevented. The transport of oxygen generally takes place through diffusion of the gaseous oxygen through the separator. For this, the separator must have open channels with a suitable pore size.

U.S. Pat. No. 3,862,861 and GB 1 364 283 disclose sealed lead accumulators which contain glass fibre mats as separators. Glass fibre separators tend to form an acid layering during the charging and discharging of the battery, i.e. layers of varying concentration within the separator, which leads to a premature capacity loss of the battery. Also, as a result of gravitational forces, a filling profile develops, i.e. a concentration of the acid in the lower part of the separator. The overall height of the battery is thereby limited and, as with the acid layering, leads to a premature capacity loss of the battery. Glass fibres break readily when the electrode plates are pressed together, which is associated with a loss of restoring force and a decrease in the pressure exerted on the plates. Because of their low elongation at break, glass fibre mats can also be processed only with difficulty. They cannot be welded and thus cannot be used as pocket separators. A particular disadvantage is that fibre mats are strongly compressible and thus display a pressure-related pore size and porosity. In addition, the use of inorganic fibres with diameters below 1 $\mu$m is not acceptable on health grounds.

To overcome some of these disadvantages, mixtures of glass fibres and organic fibres are proposed according to U.S. Pat. No. 4,908,282. However, the use of organic fibres means a lower acid absorption capacity of the separator and thus a reduced capacity of the battery.

Gel-based sealed batteries are also known. In this case, the acid between the electrode plates is transformed into a gel by adding gelling agents. For the electronic separation of the plates, the batteries additionally contain microporous separators. Gel systems display only a very small acid layering and no filling profile, but are costly because of the gel filling process and thus expensive to make. Oxygen transport takes place through cracks in the gel which form only in use, so that gel batteries initially display only a small oxygen transfer rate.

DE-C-27 20 250 discloses the use of finely-distributed silica for gel formation. This is placed between the electrode plates in the form of compressed bodies which swell to produce a highly viscous gel when the acid is added. The strength of the compressed bodies can be improved by reinforcing them with acid-resistant and oxidation-resistant fibres, but the separators are still brittle and can be handled only with difficulty.

WO 94/20995 discloses inter alia separators for sealed batteries which have a microporous matrix based on a thermoplastic polymer. The thermoplastic polymer contains an inert filler and a plasticizer, ultra-high-molecular-weight polyolefins preferably being used as polymer and precipitated silica as filler for use in batteries with acid electrolytes. However, the use of precipitated silica requires the employment of a large quantity of filler in relation to the polymer content in order to achieve the desired porosity. Because of the unfavourable ratio of filler to polymer, the mechanical properties and the oxidation stability of the separator are greatly reduced, so that dimensionally stable layers must be used for reinforcement. For this, glass fibre mats are preferably used which are at least partially embedded in the polymer layer. Manufacture of the separators is expensive because of their multi-layered structure.

U.S. Pat. No. 4,335,193 discloses battery separators which contain 40 to 90 vol. % polyolefin with an average molecular weight of 15000 to <300000 and 10 to 60 vol. % inorganic filler, preferably silica. The separators have a porosity of 30 to at most 75 vol. %, preferably 45 to 65 vol. % and are characterized by an electric resistance of less than 0.0006 $\Omega \times dm^2$/separator. A disadvantage of these separators is their low mechanical stability and poor oxidation resistance, in particular in the case of high filler contents.

The object of the present invention is to create separators for sealed lead accumulators which do not display the disadvantages described above and which in particular show a low compressibility, a small tendency to acid layering and formation of a filling profile, a high acid absorption capacity plus a high porosity and oxygen transfer rate and which are easy to manufacture.

The object is achieved by a microporous battery separator based on an essentially homogeneous mixture of a thermoplastic polymer, an inert filler and optionally a plasticizer. The separator is characterized in that it contains, as filler, pyrogenic silica in a quantity of at least 20 vol. % and optionally further fillers, so that the filler content overall is more than 60 vol. % to a maximum of 82 vol. %, preferably 67 to 80 vol. %, particularly preferably 68 to 77 vol. %.

These and, unless otherwise stated, all other percentages relate in each case to the solid separator material without taking account of the empty volume caused by the pores.

Microporous filler-containing battery separators based on a thermoplastic polymer are known for example from DE-B-14 96 123 and U.S. Pat. No. 3,351,495. It was surprisingly found that, when pyrogenic silica is used as filler, separators with the named properties can be obtained.

The battery separators according to the invention preferably contain at least 30 vol. % pyrogenic silica, particularly preferably at least 45 vol. % and quite particularly preferably more than 60 vol. % pyrogenic silica. Separators which contain exclusively pyrogenic silica as filler are most preferred.

The pyrogenic silica preferably has an average particle diameter of 4 to 50 nm, particularly preferably 5 to 40 nm and in particular 6 to 20 nm.

The surface area of the pyrogenic silica is preferably 50 to 500 $m^2/g$, particularly preferably 130 to 450 $m^2/g$ and in particular 200 to 400 $m^2/g$.

The level of further fillers in the basic composition to be extruded is 0 to 62 vol. %, preferably 0 to 52 vol. % and particularly preferably 0 to 37 vol. %.

Particularly suitable as a further filler are precipitated silica, preferably that with an average particle size of 1 to 150 $\mu$m and a BET surface area of 60 to 700 $m^2/g$, and/or substances which are soluble in the electrolyte of the accumulator, in particular soluble sulphates, such as e.g. of the alkali metals and alkaline earth metals, in particular sodium sulphate, potassium sulphate and magnesium sulphate, and also aluminum sulphate. The porosity and the acid absorption of the separator can be further increased through the use of soluble fillers. In addition, short-circuits between the electrode plates are prevented by soluble fillers. Also suitable as fillers which are insoluble in the electrolyte are the fillers disclosed in DE-B-14 96 123, in particular oxides and hydroxides of silicon, aluminum and titanium as well as mica, talc, silicates and glass balls.

The battery separators according to the invention preferably contain 18 vol. % to <40 vol. %, particularly preferably 20 vol. % to 33 vol. %, and quite particularly preferably 23 vol. % to 32 vol % of at least one thermoplastic polymer.

Suitable thermoplastic polymers are described in U.S. Pat. No. 3,351,495 and DE-B-14 96 123. Reference is hereby expressly made to the disclosure in these publications.

Preferred thermoplastic polymers are ultra-high-molecular-weight polyolefins, in particular ultra-high-molecular-weight polyethylene having an average molecular weight by weight of at least 300 000, preferably at least 1 000 000 and in particular about 3 to $8\cdot 10^6$. The standard loading-melt index of the polyolefin is essentially 0, i.e. it is smaller than 0.1 and preferably smaller than 0.01. The reduced viscosity of the polyolefin is not less than 4.0 and preferably lies above 10 and in particular above 15 dl/g. With regard to the determination of standard loading-melt index and reduced viscosity, reference is made to the aforementioned U.S. Pat. No. 3,351,495 and DE-B 1 496 123 respectively. As is explained in these publications, polyolefin mixtures can also be used. Also suitable in addition to polyethylene are in particular polypropylene, polybutene, polystyrene, ethylene-propylene copolymers, ethylene-hexylene copolymers, ethylenebutene copolymers, propylene-butene copolymers, ethylene-propylene-butene copolymers and copolymers of ethylene or propylene with an ethylenically unsaturated monocarboxylic acid, namely acrylic acid, methacrylic aid or mixtures thereof.

The volume ratio of polymer to filler is preferably 0.22 to 0.64 and in particular 0.35 to 0.55.

Particularly suitable as plasticizer are the liquids listed in DE 12 67 423, in particular esters, such as for example sebacates, fumarates, phthalates, epoxy compounds and polyesters; phosphate esters; hydrocarbons, such as for example paraffin oils and low polymers such as polyisobutylene and polybutadiene; chlorinated hydrocarbons and also sulphonamides, cumarone-indene compounds and asphalt. Plasticizers that can be extracted by organic solvents and also water-insoluble oils such as process oils are quite particularly preferred.

The plasticizer content of the finished battery separator is 0 to 20 wt. %, preferably 2 to 15 wt. % and in particular 5 to 8 wt. % relative to the total mass of thermoplastic polymer and filler.

The battery separators according to the invention thus preferably contain at least 20 vol. % pyrogenic silica, 0 to 62 vol. % other fillers, the total fillers content being >60 to 82 vol. %, 18 to <40 vol. % thermoplastic polymer and, relative to the total mass of filler and polymer, 0 to 20 wt. % plasticizer.

Apart from the named constituents the separators according to the invention can contain usual additives such as antioxidants (usually 0.1 to 2.0 vol. %), lubricants, antistatic agents, pigments, dyes, carbon black, stabilizers, light-protection agents and the like.

A particularly preferred battery separator contains from 23 to 32 vol. % polyolefin with a molecular weight of 3 to $8\cdot 10^6$ g/mol, 68 to 77 vol. % filler, preferably pyrogenic silica and, relative to the total mass of polyolefin and filler, 5 to 8 wt. % plasticizer.

The separators according to the invention display no, or only a very small, compressibility. A pressure of 1 bar effects a decrease in the thickness of the separator of at most ca. 3%, typically ca. 2%.

The low compressibility guarantees a strong restoring force and thus a good contact between separator and electrode surface.

The separators are very stable with regard to pressure loads. Even pressures of 3 bar do not lead to a destruction of the separator structure or a decrease in the restoring force. They thus permit the manufacture of accumulators with a high cycle life, i.e. a large number of possible charging and discharging processes which are suitable in particular for cyclical loadings such as for example in electric vehicles.

Because of the low compressibility, both the porosity and the acid-absorption capacity of the separators are over wide ranges largely independent of the pressure on the separator. The porosity (empty volume) of the separators according to the invention is preferably 77 to 90%, particularly preferably 78 to 88% and in particular roughly 80 to 85%, relative to the total volume of the separator.

To determine the porosity, a separator sample of minimum size 40×70 mm is dried in an oven at 110° C. for 30 min and weighed immediately after being removed from the oven (weight G1). The sample is then completely immersed for 15 min in boiling wetting agent solution, then it is completely immersed in water while suspended from a wire hook, and the weight in water is determined (weight G2). The sample is then removed from the hook, the surface water is dabbed off and the sample weighed at once (weight G3). The porosity is calculated using the formula: porosity [%]={(G3 B G1)/(G3 B G2)}×100%.

To determine the pore distribution, mercury is filled under pressure into the pores of the separator by means of a porosimeter (porosimeter model 2000, Carlo Erba). The pore volume and pore distribution are determined by evaluation of the crude data with the MILESTONE 200 software.

The separators preferably have an average pore size of 0.1 to 0.3 μm, particularly preferably 0.15 to 0.25 μm and in particular of ca. 0.2 μm. The proportion of pores with a diameter $\leq 1$ μm is preferably roughly 80 to 90%, the proportion of pores $\geq 1$ μm 10 to 20%. By stretching the extracted separator, the proportion of large pores can be increased up to 50%, the porosity to ca. 90% and the average pore size to ca. 0.94 μm.

To determine the acid absorption, a strip of the separator is completely immersed in sulphuric acid of density 1.28 g/cm$^3$ and removed after 24 h (with or without vacuum). The surface of the separator is dried and the acid absorption ascertained in g acid per g separator (g/g). The acid absorption can be calculated in g acid per m$^2$ separator via the area weight (g/m$^2$).

The acid-absorption capacity of the separators according to the invention is preferably 2.8 to 4.0 g/g, particularly preferably roughly 3.0 g/g (without vacuum), or 2.9 to 4.2 g/g, particularly preferably 3.1 g/g (with vacuum). A separator with a thickness of 1 mm thus has for example an acid-absorption capacity of at least roughly 800 g/m$^2$, preferably 900 g/m$^2$ and in particular ca. 980 g/m$^2$ (with vacuum).

The separators according to the invention permit an undisturbed diffusion of the oxygen formed at the positive electrode to the negative electrode. The oxygen transport is presumably guaranteed by free pores, i.e. those not filled with acid, in the separator. It is assumed that, because of the pore-size distribution, the absorption of acid through the separators takes place in two stages. When a separator is immersed in acid, the latter is initially absorbed mainly by the larger pores. If the separator is then removed from the acid before the saturation capacity is reached, a redistribution of the acid from the large to the smaller pores takes place because of the capillary forces, so that some of the larger pores remain essentially acid-free. These larger, unfilled pores are probably responsible for the oxygen transport from the positive to the negative electrode. If these pores are larger than the pores in the active pastes of the electrode plates, this state is maintained during the whole life of the battery.

The proportion of unfilled, large pores can be set by varying the pore-size distribution and the acid content or degree of saturation. Their proportion is chosen such that a complete transport of the oxygen formed at the positive electrode to the negative electrode is guaranteed, so that preferably all the oxygen is consumed there and thus no water consumption of the accumulator is detectable.

The acid content or degree of acid saturation depends on the treatment time of the separator with the acid and can therefore be controlled e.g. by chronological monitoring of the acid treatment. For example, a separator comprising 69.8 vol. % pyrogenic silica, 30.2 vol. % polyethylene and which, relative to the total mass of pyrogenic silica and polyethylene, contains 5 wt. % oil, absorbs about 90% of the total possible quantity of acid within about 1 to 5 minutes. A complete saturation of the separator is achieved after about 1 to 24 hours. To guarantee an adequate oxygen transport rate, this separator is for example removed from the acid after ca. 5 min.

The desired acid content can however also be achieved e.g. by impregnating the separator with a predetermined quantity of acid.

To measure the speed of the acid absorption, a strip of the separator is completely immersed in sulphuric acid for various times. The surface of the separator is then dried and the acid absorption ascertained in g acid per g separator (g/g).

Because of the effective capillary forces, the high proportion of small pores of the separators according to the invention also prevents both the occurrence of an acid filling profile and the development of acid layers of varying density in the separator when charging and discharging the battery and thus a premature decline in accumulator capacity caused thereby. This process is presumably supported by gel formation which can be deduced from the expansion of the separators in acid.

The separators according to the invention can be made for example in the way described in U.S. Pat. No. 3,351,495, DE-B-14 96 123 or EP-B-0 425 784, i.e. in particular by extrusion and subsequent extraction. The material according to the invention is preferably extruded in the form of a web and then cut to give the desired shapes. The material can be processed without problems, for example by welding or crimp sealing, to produce separator pockets.

The thickness of the separators is decisively determined by the type of battery in which the separator is to be used. In the case of sulphuric acid accumulators, a thickness of 0.1 to 3.0 mm, in particular of 0.2 to 1.5 mm is preferred.

With a thickness of 1.0 mm, the separators according to the invention preferably have an electric resistance of 50 to 150 mΩ×cm$^2$, particularly preferably less than 125 mΩ×cm$^2$.

The separators also show a high elongation at break. This is preferably 50 to 200%, in particular roughly 100%. To measure the elongation at break, a shoulder rod specimen is stretched until fracture according to DIN 53 455 using a tensile testing machine at a test speed of 305 mm/min.

The battery separators according to the invention also have a high dimensional stability vis-a-vis acids. The change in dimension in acid is usually more than roughly 1%, preferably 0% to +2%, both in and across the machine direction. To determine the change in dimension, the separator is stored for 3 hours in acid at 77 EC, watered for 5 min at room temperature and then the change in dimension in machine direction (MD) and cross-machine direction (CMD) is measured.

The separators according to the invention are suitable in particular for the manufacture of sealed lead-sulphuric acid accumulators, in particular accumulators with fixed electrolytes. The subject-matter of the invention are therefore also batteries, in particular lead-sulphuric acid accumulators, which are manufactured using the microporous separators according to the invention.

The invention is described in more detail below with the help of embodiments.

EXAMPLES

Example 1

8.84 g pyrogenic silica with a BET surface of 200 m$^2$/g and a primary particle diameter of 12 nm (Aerosil® 200, Degussa), 1.25 g polyethylene with a molecular weight of $5.6 \cdot 10^6$ g/mol (Hostalen® GUR 4130, Hoechst) and 40.0 g of a naphthenic process oil (Shellflex FC 451, Shell) were kneaded in a plastograph with measuring kneader (Mess-Kneter W 50 H and Plasti-Corder PLV 151, Brabender) at 200° C. for 5 minutes and the resultant mixture was compressed in a press at 170° C. to produce a 0.25 mm thick sheet. The sheet was completely extracted with hexane at room temperature. The extracted separator consists of 76.6 vol. % filler and 23.4 vol. % polyethylene. The electric resistance is 19 mΩ×cm², the acid absorption 3.4 g/g, the porosity 80%, the average pore diameter 0.19 μm, the proportion of pores ≦1 μm 88% and the proportion of pores ≧1 μm 12%.

Example 2

8.84 g pyrogenic silica with a BET surface of 300 m²/g and a primary particle diameter of 7 nm (Aerosil® 300, Degussa), 1.25 g polyethylene with an average molecular weight of $5.6 \cdot 10^6$ g/mol (Hostalen® GUR 4130, Hoechst) and 40.0 g of naphthenic process oil (Shellflex FC 451, Shell) were kneaded in a plastograph with measuring kneader (Mess-Kneter W 50 H and Plasti-Corder PLV 151, Brabender) at 200° C. for 5 minutes and the resultant mixture was compressed in a press at 170° C. to produce a 0.25 mm thick sheet. The sheet was completely extracted with hexane at room temperature. The extracted separator consists of 76.6 vol. % filler and 23.4 vol. % poly-ethylene. The electric resistance is 18 mΩ×cm², the acid absorption 3.6 g/g, the porosity 83%, the average pore diameter 0.19 μm, the proportion of pores <1 μm 84% and the proportion of pores >1 μm 16%.

Example 3

8.84 g pyrogenic silica with a BET surface of 380 m²/g and a primary particle diameter of 7 nm (Aerosil® 200, Degussa), 1.25 g polyethylene with an average molecular weight of $5.6 \cdot 10^6$ g/mol (Hostalen® GUR 4130, Hoechst) and 40.0 g naphthenic process oil (Shellflex FC 451, Shell) were kneaded in a plastograph with measuring kneader (Mess-Kneter W 50 H and Plasti-Corder PLV 151, Brabender) at 200° C. for 5 minutes and the resultant mixture was compressed in a press at 170° C. to produce a 0.25 mm thick sheet. The sheet was completely extracted with hexane at room temperature. The extracted separator consists of 76.6 vol. % filler and 23.4 vol. % polyethylene. The electric resistance is 15 mΩ×cm², the acid absorption 3.5 g/g, the porosity 82%, the average pore diameter 0.21 μm, the proportion of pores <1 μm 85% and the proportion of pores >1 μm 15%.

Example 4

8.48 g pyrogenic silica with a BET surface of 300 m²/g and a primary particle diameter of 7 nm (Aerosil® 300, Degussa), 2.1 g polyethylene with an average molecular weight of $5.6 \cdot 10^6$ g/mol (Hostalen® GUR 4130, Hoechst) and 39.5 g naphthenic process oil (Shellflex FC 451, Shell) were kneaded in a plastograph with measuring kneader (Mess-Kneter W 50 H and Plasti-Corder PLV 151, Brabender) at 200° C. for 5 minutes and the resultant mixture was compressed in a press at 170° C. to produce a 0.25 mm thick sheet. The sheet was completely extracted with hexane at room temperature. The extracted separator consists of 65.0 vol. % filler and 35 vol. % polyethylene. The electric resistance is 29 mΩ×cm², the acid absorption 3.1 g/g, the porosity 81%, the average pore diameter 0.15 μm, the proportion of pores <1 μm 90% and the proportion of pores >1 μm 10%.

Example 5

9.14 g pyrogenic silica with a BET surface of 300 m²/g and a primary particle diameter of 7 nm (Aerosil® 300, Degussa), 0.95 g polyethylene with an average molecular weight of $5.6 \cdot 10^6$ g/mol (Hostalen® GUR 4130, Hoechst) and 40.0 g naphthenic process oil (Shellflex FC 451, Shell) were kneaded in a plastograph with measuring kneader (Mess-Kneter W 50 H and Plasti-Corder PLV 151, Brabender) at 200° C. for 5 minutes and the resultant mixture was compressed in a press at 170° C. to produce a 0.25 mm thick sheet. The sheet was completely extracted with hexane at room temperature. The extracted separator consists of 82.0 vol. % filler and 18.0 vol. % polyethylene. The electric resistance is 22 mΩ×cm², the acid absorption 3.7 g/g, the porosity 85%, the average pore diameter 0.17 μm, the proportion of pores <1 μm 88% and the proportion of pores >1 μm 12%.

Example 6

843.5 g pyrogenic silica with a BET surface of 300 m²/g and a primary particle diameter of 7 nm (Aerosil® 300, Degussa), 165.0 g polyethylene with an average molecular weight of $5.6 \cdot 10^6$ g/mol (Hostalen® GUR 4130, Hoechst) and 4000 g naphthenic process oil (Shellflex FC 451, Shell) were extracted in a twin-screw extruder with slot die and calendered to 1 mm thickness in a heated roll mill connected downstream from the die. The sheet was extracted with hexane at room temperature to 5 wt. % oil. The extracted separator consists of 69.8 vol. % filler, 30.2 vol. % polyethylene and, relative to the total mass of polyethylene and filler, 5.0 wt. % oil. The electric resistance is 110 mΩ×cm², the acid absorption 3.0 g/g, the porosity 81%, the average pore diameter 0.24 μm, the proportion of pores <1 μm 82% and the proportion of pores >1 μm 18%, the elongation at break 130% and the change in dimension in sulphuric acid ("acid shrinkage")+1.0% (expansion).

To determine the filling profile in the separator possibly resulting from gravity (acid drainage), 20×400 mm long strips of the separator were impregnated with acid (3.0 g/g acid absorption) and stored vertically in an atmosphere saturated with water vapour. After various times the separator strips were cut into four pieces of 20×100 mm each and the quantity of acid absorbed in relation to height was then determined. Even after 14 days a uniform acid absorption (in each case 3.0 g/g) was measured regardless of height.

To determine the acid layering, the upper and the lower half of a separator strip (25×80 mm) were impregnated with acid of varying density (acid density in the upper half: 1.6 g/cm³; lower half: 1.2 g/cm³). The separator strip was stored vertically and the acid density in the upper and the lower half was measured after various times. Compared with a glass mat separator, the acid of the higher layer decreased more slowly by a factor of 6, i.e. the tendency to develop acid layers with varying concentrations inside the separator is clearly less.

Example 7

848.4 g pyrogenic silica with a BET surface of 300 m²/g and a primary particle diameter of 7 nm (Aerosil® 300, Degussa), 210.0 g polyethylene with an average molecular weight of $5.6 \cdot 10^6$ g/mol (Hostalen® GUR 4130, Hoechst) and 3959 g of a naphthenic process oil (Shellflex FC 451, Shell) were extracted in a twin-screw extruder with slot die and calendered to 1 mm thickness in a heated roll mill connected downstream from the die. The sheet was completely extracted with hexane at room temperature. The extracted separator consists of 65.0 vol. % filler and 35.0 vol. % polyethylene. The electric resistance is 120 mΩ×cm², the acid absorption 2.8 g/g, the porosity 81%, the average pore diameter 0.24 μm, the proportion of pores <1 μm 84% and the proportion of pores >1 μm 16% and the elongation at break 150%.

The completely extracted separator was biaxially stretched by 100% in each case in a tensile stretching machine. As a result of the stretching, the porosity increased to 87 vol. %, the average pore diameter to 0.94 μm and the proportion of large pores to 48%. On the other hand, the acid absorption remained unchanged at 2.8 g/g, which indicates that the pores which formed and became larger because of the stretching remain unfilled and are thus available for the oxygen transfer.

Example 8

5.30 g pyrogenic silica with a BET surface of 300 m²/g and a primary particle diameter of 7 nm (Aerosil® 300, Degussa), 5.47 g precipitated silica with a BET surface of 175 m²/g and a primary particle diameter of 18 nm (FK 320, Degussa), 1.5 g polyethylene with an average molecular weight of 5.6·10⁶ g/mol (Hostalen® GUR 4130, Hoechst) and 38.0 g of a naphthenic process oil (Shellflex FC 451, Shell) were kneaded in a plastograph with measuring kneader (Mess-Kneter W 50 H and Plasti-Corder PLV 151, Brabender) at 200° C. for 5 minutes and the resultant mixture was compressed in a press at 170° C. to produce a 0.25 mm thick sheet. The sheet was completely extracted with hexane at room temperature. The extracted separator consists of 76.6 vol.-% filler (38.3 vol. % pyrogenic silica and 38.3 vol. % precipitation silica) and 23.4 vol.-% polyethylene. The electric resistance is 19 mΩ·cm², the acid absorption 2.8 g/g and the porosity 79%.

Example 9

7.70 g pyrogenic silica with a BET surface of 300 m²/g and a primary particle diameter of 7 nm (Aerosil® 300, Degussa), 1.53 g polyethylene with an average molecular weight of 5.6·10⁶ g/mol (Hostalen® GUR 4130, Hoechst), 30.85 g of a naphthenic process oil (Shellflex FC 451, Shell) and 10.0 g sodium sulphate were kneaded in a plastograph with measuring kneader (Mess-Kneter W 50 H and Plasti-Corder PLV 151, Brabender) at 200° C. for 5 minutes and the resultant mixture was compressed in a press at 170° C. to produce a 0.25 mm thick sheet. The sheet was completely extracted with hexane at room temperature. The separator which was separated and immersed in acid consists of 69.8 vol.-% filler and 30.2 vol.-% polyethylene. The acid absorption is 3.6 g/g and the porosity 85%.

Example 10 (Comparative example)

12.39 g precipitated silica with a BET surface of 175 m²/g and a primary particle diameter of 18 nm (FK 320, Degussa), 1.7 g polyethylene with an average molecular weight of 5.6·10⁶ g/mol (Hostalen® GUR 4130, Hoechst) and 36.5 g of a naphthenic process oil (Shellflex FC 451, Shell) were kneaded in a plastograph with measuring kneader (Mess-Kneter W 50 H and Plasti-Corder PLV 151, Brabender) at 200° C. for 5 minutes and the resultant mixture was compressed in a press at 170° C. to produce a 0.25 mm thick sheet.

The sheet was completely extracted with hexane at room temperature. The extracted separator consists of 76.6 vol. % filler and 23.4 vol. % polyethylene. The electric resistance is 30 mΩ×cm², the acid absorption 2.2 g/g, the porosity 75%, the average pore diameter 0.16 μm, the proportion of pores <1 μm 87% and the proportion of pores >1 μm 13%. With the same filler and polymer content, porosity and acid absorption are clearly less than in the case of examples 1 to 3.

Example 11 (Comparative example)

9.38 g precipitated silica with a BET surface of 400 m²/g (Sylobloc®, Grace), 1.3 g polyethylene with an average molecular weight of 5.6·10⁶ g/mol (Hostalen® GUR 4130, Hoechst) and 39.5 g of a naphthenic process oil (Shellflex FC 451, Shell) were kneaded in a plastograph with measuring kneader (Mess-Kneter W 50 H and Plasti-Corder PLV 151, Brabender) at 200° C. for 5 minutes and the resultant mixture was compressed in a press at 170° C. to produce a 0.25 mm thick sheet. The sheet was completely extracted with hexane at room temperature. The extracted separator consists of 76.6 vol. % filler and 23.4 vol. % polyethylene. The electric resistance is 44 mΩ×cm, the acid absorption 2.3 g/g, the porosity 74%, the average pore diameter 0.19 μm, the proportion of pores <1 μm 81% and the proportion of pores >1 μm 19%. Examples 10 and 11 show that when precipitated silica is used, for the same filler and polymer content, both the porosity and the acid absorption of the separators are clearly less than in examples 1 to 3.

What is claimed is:

1. Microporous battery separator based on an essentially homogeneous mixture of at least one thermoplastic polymer, at least one inert filler and optionally at least one plasticizer, characterized in that the separator contains, as filler, at least 20 vol.-% pyrogenic silica and optionally one or more further fillers, so that the filler content overall is more than 60 up to a maximum of 82 vol.-% in each case relative to the solid separator material.

2. Battery separator according to claim 1, characterized in that it contains at least 30 vol.-% pyrogenic silica.

3. Battery separator according to claim 1, characterized in that it contains at least 45 vol.-% pyrogenic silica.

4. Battery separator according to claim 1, characterized in that it contains at least 60 vol.-% pyrogenic silica.

5. Battery separator according to claim 1, characterized in that it contains exclusively as filler pyrogenic silica.

6. Battery separator according to claim 1, characterized in that it contains a) at least 20 vol.-% pyrogenic silica;
   b) 0 to 62 vol.-% other fillers, the total filler content being >60 to 82 vol.-%;
   c) 18 to <40 vol.-% thermoplastic polymer; and
   d) relative to the total mass of filler and polymer, 0 to 20 wt.-% plasticizer.

7. Battery separator according to claim 6, characterized in that in total it contains 67 to 80 vol.-% filler.

8. Battery separator according to claim 6, characterized in that it contains 2 to 15 wt.-% plasticizer.

9. Battery separator according to claim 6, containing in total 67 to 80 vol.-% filler.

10. Battery separator according to claim 6, containing in total 68 to 77 vol.-% filler.

11. Battery separator according to claim 6, containing 20 to 33 vol.-% thermoplastic polymer.

12. Battery separator according to claim 6, containing 23 to 32 vol.-% thermoplastic polymer.

13. Battery separator according to claim 1, characterized in that the thermoplastic polymer is ultra-high-molecularweight polyolefin with an average molecular weight by weight of at least 300,000.

14. Battery separator according to claim 1, characterized in that the thermoplastic polymer is ultra-high-molecular-weight polyolefin with an average molecular weight of at least $1 \cdot 10^6$.

15. Battery separator according to claim 1, characterized in that the thermoplastic polymer is ultra-high-molecular-weight polyolefin with an average molecular weight by weight of 3 to $8 \cdot 10^6$.

16. Battery separator according to claim 15, wherein the separator contains at least 30 vol.-% pyrogenic silica and 23 to 32 vol.-% thermoplastic polymer.

17. Battery separator according to claim 16, containing 2 to 15 wt. % plasticizer relative to the total mass of thermoplastic polymer and filler.

18. Battery separator according to claim 1, characterized in that it contains, as said plasticizer, a water-insoluble oil and/or process oil.

19. Battery separator according to claim 1, characterized in that it contains, as said further filler, precipitated silica.

20. Battery separator according to claim 1, characterized in that it displays a porosity of 77 to 90%.

21. Battery separator according to claim 20, characterized in that it displays a porosity of 78 to 88%.

22. Battery separator according to claim 1, characterized in that it displays an acid-absorption capacity of 2.8 to 4.0 g acid per g separator (without vacuum).

23. Battery separator according to claim 1, characterized in that it displays an average pore size of 0.1 to 0.3 $\mu$m.

24. Battery separator according to claim 23, characterized in that it displays an average pore size of 0.15 to 0.25 $\mu$m.

25. Battery separator according to claim 1, characterized in that the proportion of pores with a diameter of $\leq 1$ $\mu$m is 80 to 90% and the proportion of pores with a diameter of $\geq 1$ $\mu$m is 10 to 20%.

26. Battery separator according to claim 1, characterized in that it displays an elongation at break of 50 to 200%.

27. Battery separator according to claim 1, characterized in that it shows a change in dimension of from −1% to +2% in acid.

28. Lead-sulphuric acid accumulator containing at least two oppositely charged electrode plates and at least one separator, characterized in that it contains a separator according to claim 1.

29. Lead-sulphuric acid accumulator according to claim 28, characterized in that the accumulator is a sealed accumulator.

30. Lead-sulphuric acid accumulator according to claim 28, characterized in that the accumulator contains a fixed electrolyte.

31. Lead-sulphuric acid accumulator according to claim 28, characterized in that the separator or separators contain a quantity of acid which is such that the proportion of pores not filled with acid guarantees a transport of the oxygen formed at the positive electrode to the negative electrode to such an extent that no water consumption of the accumulator is detectable.

32. Lead-sulphuric acid accumulator of claim 28, wherein said accumulator includes an electrolyte, and wherein said separator contains, as said further filler, such substances as are soluble in said electrolyte.

* * * * *